Feb. 6, 1968   C. B. KURZ   3,367,686
ATTACHMENT OF AN END FITTING TO A SOLID ELONGATE MEMBER
Filed May 23, 1967

INVENTOR.
CHARLES B. KURZ
BY
his Attorney

United States Patent Office 3,367,686
Patented Feb. 6, 1968

3,367,686
ATTACHMENT OF AN END FITTING TO A SOLID ELONGATE MEMBER
Charles B. Kurz, North Muskegon, Mich., assignor to Koppers Company, Inc., a corporation of Delaware
Continuation-in-part of application Ser. No. 372,041, June 2, 1964. This application May 23, 1967, Ser. No. 640,580
4 Claims. (Cl. 287—20.3)

ABSTRACT OF THE DISCLOSURE

Attachment of a fitting to the end of a solid elongate filament reinforced resin member comprises inserting a plug into a prepared hole in the end of the member which flares the member outwardly to mating relation with the walls of a bore in the fitting to be attached to the end of the rod. The contour of the plug has a single or a double taper corresponding to a single or double taper of the walls of the bore in the fitting. The plug is adhesively secured in the hole in the end of the member and the member is also adhesively secured in the fitting.

Cross reference to related application

This application is a continuation-in-part of application Serial No. 372,041, filed June 2, 1964.

Background of the invention

This invention relates to filament reinforced resin members and more particularly to the attachment of a fitting to the end of a solid elongate filament reinforced resin member.

Filament reinforced elongate resin members, such as cylindrical rods that are reinforced with elongate glass fibers, are particularly useful as structural members because of their high strength-to-weight ratio, but, their use has not been more widespread due to certain fabrication difficulties. Particularly, it has been difficult to satisfactorily attach a fitting to the end of an elongate filament reinforced resin rod that is subjected to tensile loads.

Forming threads on the external end surfaces of the rod does not provide a suitable coupling because threading requires cutting of the individual filaments that reinforce the resin material thereby destroying their continuity. Also, cutting of the filament reinforcements adjacent the surface of the rod materially reduces the strength characteristics of the rod.

Merely cementing a fitting to the end of a cylindrical rod has also proved inadequate. Tensile loads exerted in the axial direction of the rod cause a shearing action at the mating surfaces of the fitting and the rod, and these shearing forces result in a breakdown of the adhesive bond. Thus, a fitting that is merely cemented to the end of a cylindrical rod cannot withstand an axial load of any appreciable magnitude.

Summary of the invention

The attachment of a fitting to the end of an elongate filament reinforced resin rod includes a plug having a frusto portion disposed in an axial hole in the end of the rod which distends the annular walls surrounding the hole into a mating relation with the divergent frusto wall portion of a bore in the end fitting. The plug may have a single frusto portion, or tandem frusto portions corresponding to single frusto wall portion or a tandem frusto wall portions of the bore in the fitting.

For a further understanding of the invention and for advantages and features thereof, reference may be made to the following description taken in conjunction with the drawing which shows, for the purpose of exemplification embodiments of the invention.

Detailed description

Figure 1:
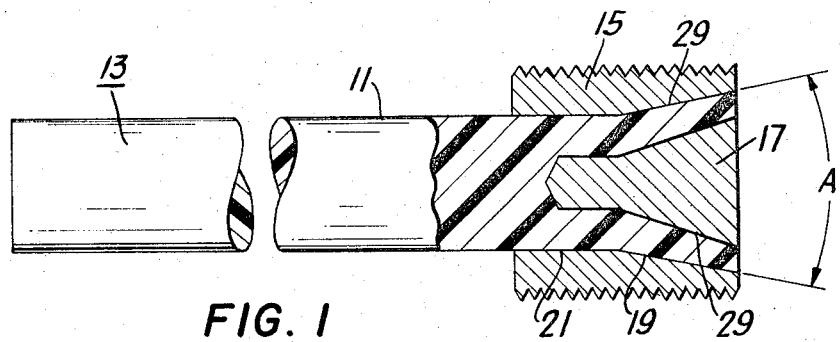
FIG. 1 is a view, partly in section, of a fitting secured to one end of a filament reinforced resin member in accordance with one embodiment of the invention.

FIG. 1 illustrates an end portion 11 of a filament reinforced resin member 13, that is preferably cylindrical, to which a threaded end fitting 15 is secured. The extreme end portion of the rod 13 is flared outwardly by means of a plug 17 so that the outer surface of the end portion of the rod engages and mates with the diverging, outwardly tapering frusto wall portion 19 of an axial bore 21 in the fitting 15.

Figure 2:
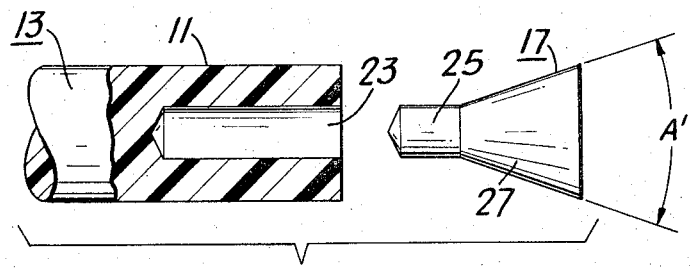
FIG. 2, taken with FIG. 1, illustrates steps to accomplish the attachment of the fitting of FIG. 1.

FIG. 2 illustrates that the end portion 11 of the rod 13 is prepared to receive the plug 17 by first making in the end portion 11 a bore or hole 23 that is substantially coaxial with the axis of rod 13.

The plug 17, as shown in FIG. 2, has a cylindrical pilot portion 25 and a frusto portion 27, integrally formed with the pilot portion 25. Particularly, the diameter of the bore 23 is substantially the same as the diameter of the pilot portion 25, and the depth of the bore or hole 23 is substantially equal to the overall length of the plug 17.

Figure 3:
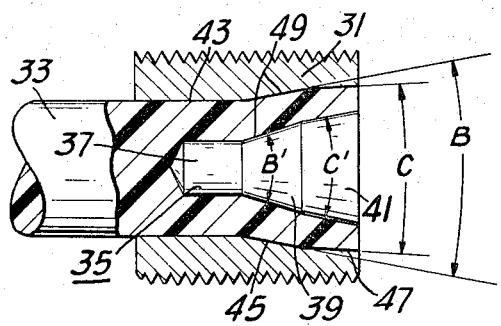
FIG. 3 is a view, partly in section, of a fitting secured to one end of a filament reinforced resin member in accordance with another embodiment of the invention.

When the pilot portion 25 of the plug 17 is inserted into the bore 23 and the plug 17 is urged toward the left, as viewed in FIG. 3, the annular portion of the end 11 of the rod 13 flares outwardly under the influence of the frusto portion 27 of the plug 17. The annular portion of the end 11 flares outwardly into mating relation with the divergent outwardly tapering frusto wall 19, as shown in FIG. 1.

In the embodiment of the invention as shown in FIG. 1, the diverging outwardly tapering frusto walls 19 define an included angle A that is somewhat less than an included angle A', defined by the walls of the frustum 27 of the plug 17, since the volume of the rod material in the flared condition is the same as the volume of the rod material in the annular walls around the axial hole in the end of the rod 13. This condition is achieved when the cross sectional area of rod material in the flared condition is the same as the cross sectional area, at corresponding locations along the axis of the rod, of the annular, unflared rod material. Thus, under such conditions, the angle A is somewhat less than the angle A', but in any condition the outer surface of the flared end of the rod mates with the divergent walls 19 of the bore in the fitting. Also, the wall 19 diverges from the axis of the bore at an angle which is one-half the included angle A, and the wall of the frustum 27 diverges at an angle which is one-half the included angle A'.

In a particular application, the angles A and A' are correlated so that when the plug 17 is urged into the hole 23 and the cylindrical annular walls become flared, the outer surface of the flared end portion of the rod 13 mates closely with the divergent outwardly tapering wall 19 of the fitting 15. When such is accomplished, there is no change in volume of the rod material in the flared end portion; and the longitudinal filament reinforcings in the resin material remain straight and are not crushed or otherwise damaged due to the flaring by the plug 17. Moreover, since the longitudinal filament reinforcings remain straight, the structural integrity of the fibers at the surface of the rod is maintained.

To insure that the threaded end fitting 15 remains in position when it is not subjected to an axial tensile load, it is desirable to apply a suitable adhesive 29 both to the mutually contacting surfaces of the bore 21, 19 and the outer surface of the rod 13, and to the mutually contacting surfaces of the plug 17 and the hole 23 in the rod 13.

In any application, the included angle A′ of the frustum 27 is critical. If the angle A′ is too large, the forces acting normal to the frustum surface will either crush the filament reinforcements in the resin rod, or expel the plug 17 from the hole in the rod. Likewise, if the angle A is too small, the flaring of the end portion of the rod will not hold the fitting and the fitting will slide off the end of the rod. A range of angles for angle A′, that are suitable for securing an end fitting to the end of a rod in the manner of the invention, is between 4° and 8°.

FIG. 3 illustrates another embodiment of the invention wherein another threaded end fitting 31 is secured to the end portion of a rod 33 by means of a plug 35 that has a cylindrical pilot portion 37 and integrally formed contiguous tandem frustums 39 and 41. The included angle of the frustum portion 39 is B′ and the included angle of the frustum portion 41 is C′, with the angle C′ being slightly less than the angle B′. In this instance the sides of the frustums 39, 41 diverge from the axis of the rod at angles respectively which are equal to one-half the included angles B′ and C′.

The threaded end fitting 31 has an axial cylindrical bore portion 43 and contiguous tandem outwardly tapering divergent axial bores 45 and 47 which have included angles B and C respectively. The included angle B is somewhat greater than the included angle C; the included angle B is somewhat less than the included angle B′; and the included angle C is somewhat less than the included angle C′.

In the embodiment of the invention of FIG. 3, the end of the rod 33 is prepared in the same manner as described herein; that is, an axial hole is formed in the end of the rod 33 to receive the pilot portion 37 of the plug 35. When the plug 35 is urged into the hole in the end of the rod, tandem flaring of the annular walls of the end of the rod is accomplished by virtue of the action of the tandem frustums 39 and 41. Such flaring of the end portion of the rod 33 brings the surface of the rod into mating relation with the tandem tapering portions 45, 47 of the bore in the end fitting 31.

Now, the volume of rod material in the flared condition is the same as the volume of material in the annular walls around the axial hole in the end of the rod. So, in any particular application, the angles B and B′, as well as angles C and C′ are correlated so that the outer flared surface of the rod mates with the divergent outwardly tapering wall portions 45, 47 of the bore in the fitting 31.

As mentioned previously, the fitting 31 may be adhesively secured to the end portion of the rod 33 by a suitable adhesive 49 that will maintain the fitting in position when no axial load is impressed upon the rod. Likewise, the plug 35 may be maintained within the end portion of the rod 33 by a similar suitable adhesive 49.

The angles B′ and C′, like the angle A′, are critical for the same reasons mentioned herein. It has been found that the angle B′ may be within the range of 7° to 11° and the angle C′ may be within the range of 4° to 8°.

Those skilled in the art should recognize the advantages of the embodiment of the invention illustrated in FIG. 3. In the first place, the tandem-frustum type plug does not flare the end of the rod as much as a single-frustum plug having the same included angle B′ would do. Excessive flaring would require structural changes in the bore of the end fitting and a weakening of the fitting could result. In the second place, the forces acting normally to the inclined surfaces of the frustums 39, 41 have horizontal components that add vectorially to thereby, produce additional end fitting holding power in contrast to a plug having only a single frustum. For these and other reasons known to those having ordinary skill in the art, the features and advantages of the embodiment of the invention shown in FIG. 3 are particularly significant.

While in the preferred embodiment of the invention the plugs 17 and 35 are made of steel, it will be understood by those skilled in the art that any other suitable metal, or a suitable plastic material may be used if preferred. Likewise, in a preferred embodiment of the invention, the rods 13 and 33 are cylindrical, but this does not necessarily limit the invention to cylindrical rods inasmuch as solid rods having any desired geometrical cross sectional shape may be used if preferred. Likewise, the plugs 17 and 35 may be comprised of a pilot portion having a polygonal cross sectional shape, or an elliptical cross sectional shape, or the plugs may be a frustum or frustums of a pyramid or pyramids having a polygonal cross sectional shape or an elliptical shape.

A feature of the present invention is that forces acting on the flared end portion of the rods tending to slide the fitting off the rod, when the rod is under an axial tensile load, are less than such forces acting on a rod that does not flare outwardly. A feature of the invention is that the forces acting on the end of the rod which has the double tandem tapers are less than those acting on the end of the flared rod having only a single taper. Accordingly, a fitting attached to the end of the rod in the manner of the invention can withstand greater axial tensile loads than fittings attached to the ends of rods in the manner known heretofore.

Although the invention has been described herein with a certain degree of particularity, it is understood that the present disclosure has been made only as an example and that the scope of the invention is defined by what is hereinafter claimed.

What is claimed is:

1. The combination comprising:
  (a) a sleeve type fitting having a first axial bore therethrough including a cylindrical first portion, a first frusto-conical portion coaxial and contiguous with said cylindrical portion and a second frusto-conical portion coaxial and contiguous with said first frusto-conical portion, said first frusto-conical portion having a first included angle that is greater than the second included angle of said second frusto-conical portion;
  (b) a solid cylindrical glass filament reinforced resin rod passing through said first axial bore and having in the end portion thereof a second axial bore;
  (c) a plug disposed in said second axial bore whereby the walls around said second axial bore are distended and the outer surface of said rod within said first axial bore mates with the walls of bore configuration in said sleeve fitting, said plug having a cylindrical pilot portion, a coaxial contiguous third frusto-conical portion and a coaxial contiguous fourth frusto-conical portion, said third and fourth frusto-conical portions having respective third and fourth included angles; wherein
  (d) said third included angle is greater than said first included angle;
  (e) said fourth included angle is greater than said second included angle; and
  (f) said third included angle is greater than said fourth included angle.

2. The structure of claim 1 wherein:
  (a) said third included angle is within the range of 7° to 11°; and
  (b) said fourth included angle is within the range of 4° to 8°.

3. The invention of claim 1 including:
  (a) a hardenable adhesive disposed between the mating surfaces of said first axial bore and said flared end surface of said rod.

4. The invention of claim 3 including:
  (a) a hardenable adhesive disposed between the mating surfaces of said plug and the distended walls around the axial bore in the end of said rod.

References Cited

UNITED STATES PATENTS

| 2,846,277 | 8/1958 | Marsh | 306—29 |
| 2,874,937 | 2/1959 | Higgins | 287—124 |
| 2,899,672 | 8/1959 | Lewis | 287—20.3 XR |
| 3,027,953 | 4/1962 | Coski | 287—126 XR |
| 3,085,305 | 4/1963 | Colombet et al. | 287—81 XR |
| 3,129,282 | 4/1964 | Flynn | 287—124 XR |

FOREIGN PATENTS 150,122   9/1920   Great Britain.

CARL W. TOMLIN, *Primary Examiner.*

ANDREW KUNDRAT, *Assistant Examiner.*